L. C. BALDWIN & E. C. BUFFINGTON.
BOBBIN BORING MACHINE.
APPLICATION FILED JULY 17, 1907.

974,545.

Patented Nov. 1, 1910.
6 SHEETS—SHEET 1.

Fig. 1.

WITNESSES:
Chas. H. Leyther
Ada E. Hagerty

INVENTORS:
Luther C. Baldwin
Edwin C. Buffington
by Joseph H. Miller
ATTORNEY

L. C. BALDWIN & E. C. BUFFINGTON.
BOBBIN BORING MACHINE.
APPLICATION FILED JULY 17, 1907.

974,545.

Patented Nov. 1, 1910.
6 SHEETS—SHEET 2.

Fig. 2.

WITNESSES:
Chas. H. Luther
Ada E. Hagerty.

INVENTORS:
Luther C. Baldwin and
Edwin C. Buffington
Joseph A. Miller
ATTORNEY.

L. C. BALDWIN & E. C. BUFFINGTON.
BOBBIN BORING MACHINE.
APPLICATION FILED JULY 17, 1907.

974,545.

Patented Nov. 1, 1910.
6 SHEETS—SHEET 4.

WITNESSES:
Chas. H. Luther
Ada E. Hagerty

INVENTORS:
Luther C. Baldwin
Edwin C. Buffington
By Joseph H. Miller
ATTORNEY L. C. BALDWIN & E. C. BUFFINGTON.
BOBBIN BORING MACHINE.
APPLICATION FILED JULY 17, 1907.

974,545.

Patented Nov. 1, 1910.
6 SHEETS—SHEET 6.

WITNESSES:
Chas. H. Luther
Ada E. Fagerty

INVENTORS:
Luther C. Baldwin
Edwin C. Buffington
by Joseph H. Miller
ATTORNEY

UNITED STATES PATENT OFFICE.

LUTHER C. BALDWIN, OF PROVIDENCE, RHODE ISLAND, AND EDWIN C. BUFFINGTON, OF MANCHESTER, NEW HAMPSHIRE, ASSIGNORS TO U. S. BOBBIN & SHUTTLE CO., OF PROVIDENCE, RHODE ISLAND, A CORPORATION OF NEW JERSEY.

BOBBIN-BORING MACHINE.

974,545. Specification of Letters Patent. Patented Nov. 1, 1910.

Application filed July 17, 1907. Serial No. 384,269.

*To all whom it may concern:*

Be it known that we, LUTHER C. BALDWIN and EDWIN C. BUFFINGTON, citizens of the United States, residing, respectively, at Providence, county of Providence, and State of Rhode Island, and Manchester, county of Hillsboro, and State of New Hampshire, have invented a new and useful Improvement in Bobbin-Boring Machines, of which the following is a specification.

This invention has reference to an improvement in wood working machinery and more particularly to an improvement in bobbin boring machines.

The object of our invention is to improve the construction of a bobbin boring machine whereby the successive operations of feeding the bobbin blanks to the machine, boring the bobbin blanks and ejecting the bored bobbins from the machine are performed automatically.

A further object of our invention is to provide a bobbin boring machine that will bore shuttle or similar bobbins more accurately than has heretofore been done.

A still further object of our invention is to increase the production of bobbin boring machines, thereby decreasing the cost of manufacturing bobbins for loom shuttles, spinning frames or similar machines.

Our invention consists in the peculiar and novel construction of an automatic bobbin boring machine, said machine having a series of bobbin holders rotatably supported in a circle, means for giving an intermittent motion in a circular path to the bobbin holders, means for revolving the bobbin holders, means for receiving and locking a bobbin blank in the bobbin holders, means for automatically feeding bobbin blanks to the bobbin holders, a tool holder adapted to hold a series of drills of varying lengths in a circle, means for operating the tool holder to force the drills centrally into the bobbin blanks, thereby giving a plurality of borings of varying depths to the bobbin blanks in one operation of the machine, means for automatically ejecting the bored bobbins from the bobbin holders, and details of construction, as will be more fully set forth hereinafter and claimed.

The figures in the drawings are all shown with the operative parts in the position they would assume at the beginning of one complete operation of the machine.

In the drawings, *a* indicates the frame of the machine, *b* the driving pulley, *c* the driving shaft, $d$ the cam shaft, $e$ the back shaft, $f$ the fixed supporting bar, $g$ the bobbin holder frame, $h$ the bobbin holders, $i$ the bobbin holder frame operating arm, $k$ the bobbin holder frame locking mechanism, $l$ the bobbin holder operating mechanism, $m$ the bobbin holder unlocking cam, $n$ the hopper, $o$ the bobbin blank feed mechanism, $p$ the tool holder, $r$ the tool holder operating mechanism, $s$ the charging rod, $t$ the delivery trough, $v$ a bobbin blank and 1, 2, 3, 4, 5, 6, 7, 8, 9 and 10 drills of varying lengths secured in the tool holder.

Figure 1:
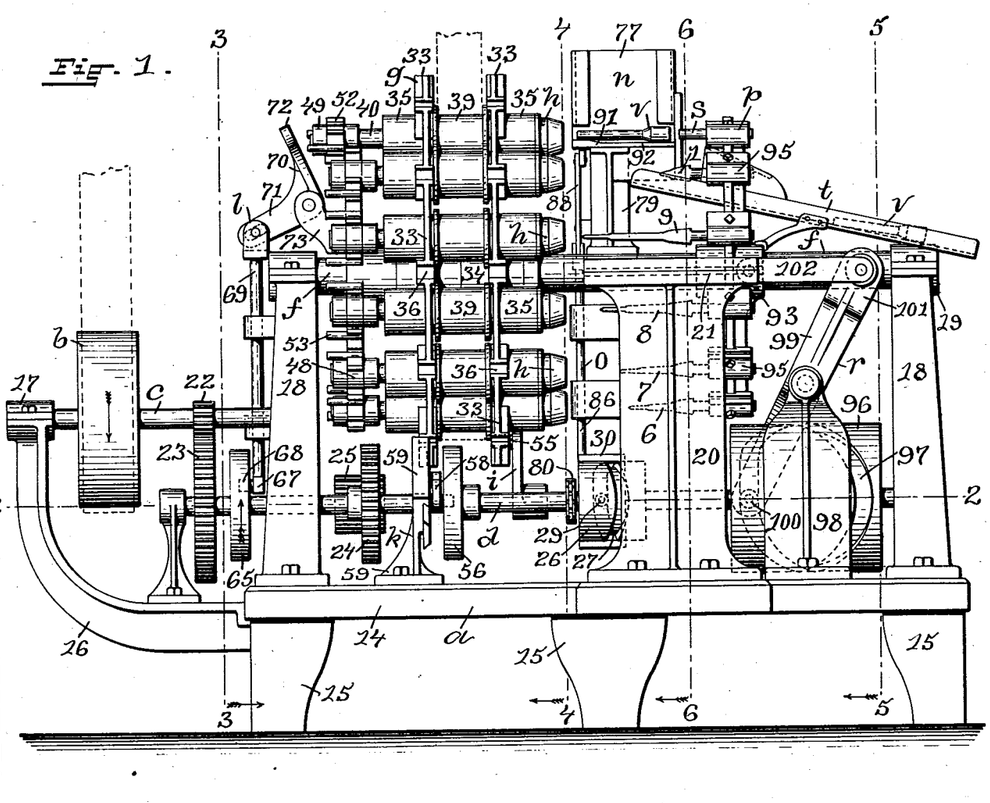
Figure 1 is a front elevation of the machine, showing the main driving belt and the belt for driving the bobbin holders in broken lines.
Figure 2:
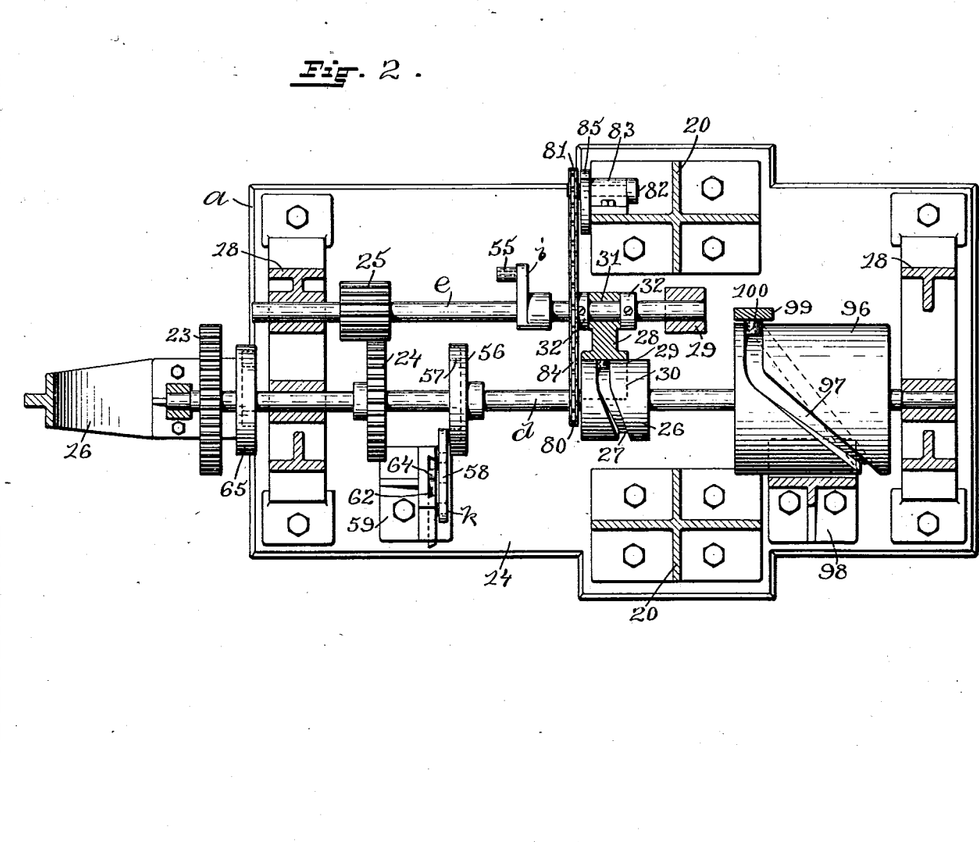
Fig. 2 is a sectional plan view taken on line 2 2 of Fig. 1, showing the cam shaft and the means for revolving and reciprocating the back shaft showing various parts, such as the gears and cam drum in full lines.
Figure 5:
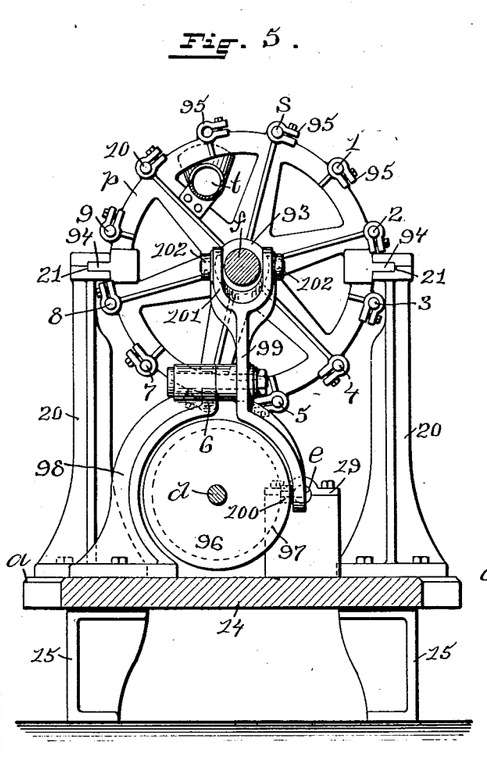
Fig. 5 is a vertical sectional view taken on line 5 5 of Fig. 1, showing the circular tool holder and the means for guiding and giving a reciprocating motion to the same.

The frame $a$ consists of a bed 14 supported on the legs 15 15 and supporting the end bracket 16 having a bearing 17 for the outer end of the driving shaft $c$, the end supports 18 18 upholding the supporting bar $f$ and having bearings for the driving shaft $c$, the cam shaft $d$ and the back shaft $e$, the bearings 19 for the inner end of the back shaft $e$ and the guide supports 20 20 having the guide ways 21 21 for the tool holder $p$, as shown in Figs. 1, 2 and 5.

Figure 6:
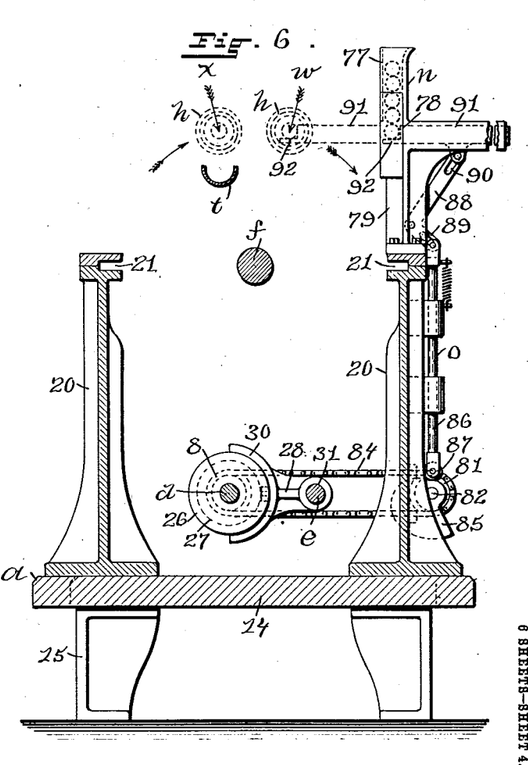
Fig. 6 is a vertical sectional view taken on line 6 6 of Fig. 1, showing the means for automatically feeding the bobbin blanks to the bobbin holders.

The driving shaft $c$ has the driving pulley $b$ and a pinion 22 meshing with a gear 23 on the cam shaft $d$, and a gear 24 on the cam shaft $d$ meshes with a wide-faced pinion 25 on the back shaft $e$, as shown in Figs. 1 and 2. A cam 26 having a cam groove 27 in its periphery is secured to the cam shaft $d$. An arm 28, having a roll 29, a semi-circular end 30 and a transverse hole 31 in the opposite end for the back shaft $e$, is held against longitudinal movement on the back shaft $e$ and in by the collars 32 32 on the shaft $e$, and in a position for the roll 29 to enter the cam groove 27 in the cam 26 and for the semi-circular end 30 of the arm to engage with the peripheral face of the cam 26, as shown in Figs. 2 and 6.

Figure 3:
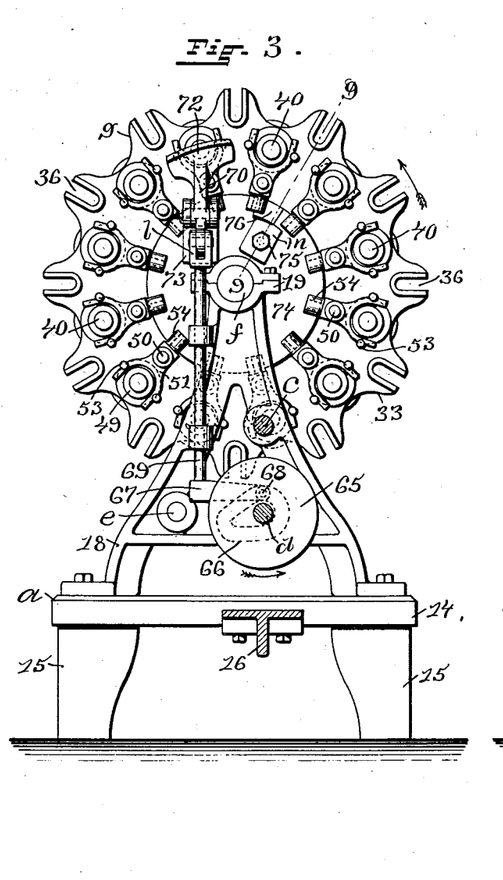
Fig. 3 is a vertical sectional view taken on line 3 3 of Fig. 1, showing the means of operating the bobbin blank locking mechanism in the bobbin holders.

The supporting bar $f$ extends centrally lengthwise above the bed 14 and is rigidly secured at each end in the top of the end supports 18 18, as shown in Figs. 1 and 3.

Figure 4:
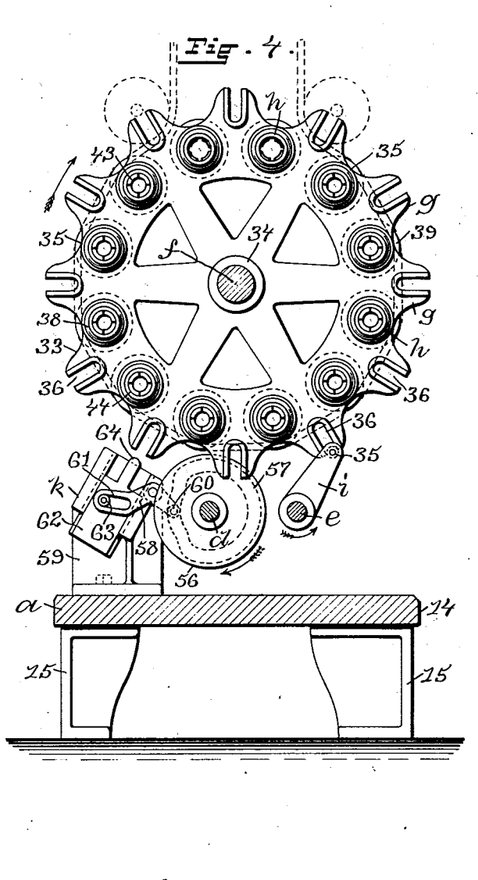
Fig. 4 is a vertical sectional view taken on line 4 4 of Fig. 1, showing the means for giving an intermittent rotary motion to the bobbin holder frame, the means for locking the bobbin holder frame and the belt for driving the bobbin holders, shown in broken lines.

The bobbin holder frame $g$ consists of two circular frame members 33 33 each having a central hub 34 for rotatably supporting the same on the bar $f$, a series of preferably twelve bearings 35 35 formed in a circle adjacent the periphery of the members at equal distances apart and parallel with the bar $f$ and a series of twelve intermediate slots 36 36 extending radially inward from the periphery of the members at equal distances apart, as shown in Figs. 1 and 4. The frame members 33 33 of the frame $g$ are secured together in a position to bring the bearings 35 35 on the frame members in alinement.

Figure 7:
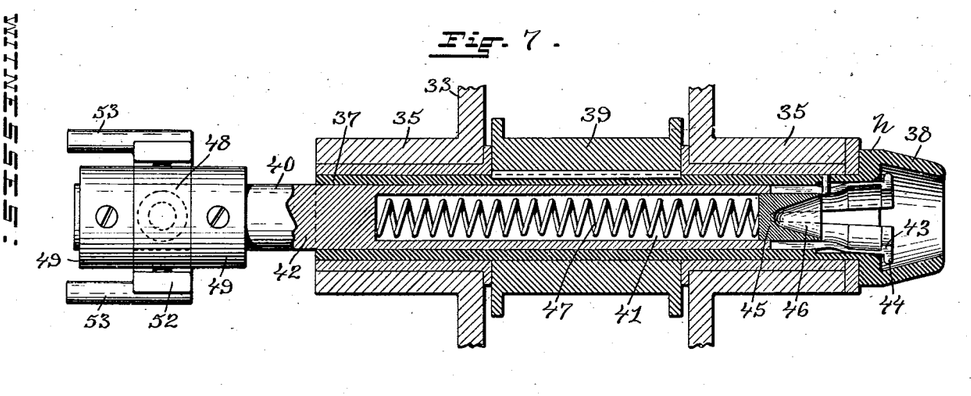
Fig. 7 is an enlarged detail sectional view taken lengthwise through one of the bobbin holders and showing the bobbin blank locking mechanism in the open position for receiving a bobbin blank.
Figure 8:
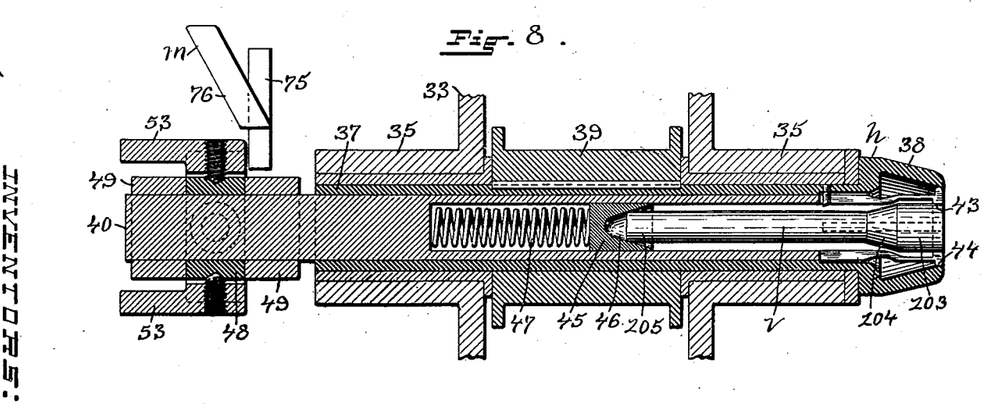
Fig. 8 is an enlarged detail sectional view similar to Fig. 7, showing a bobbin blank locked in the bobbin holder and the cam plate for unlocking the bobbin holder.
Figure 9:
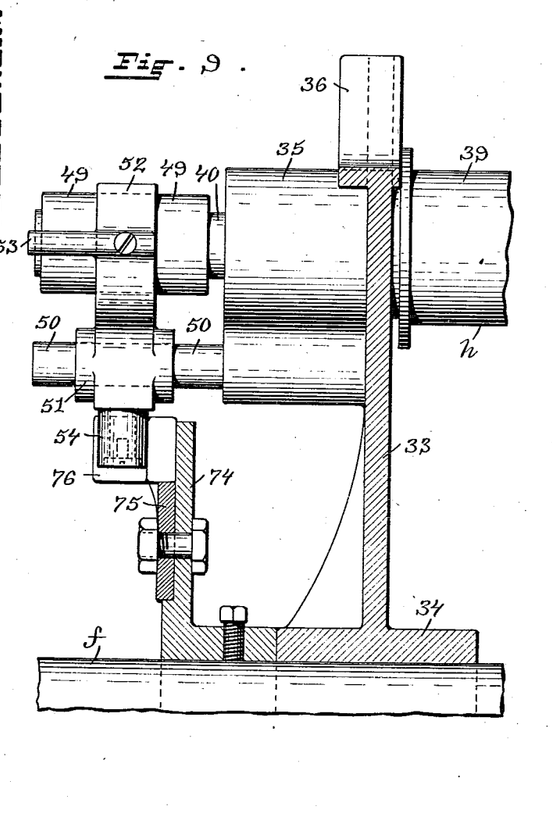
Fig. 9 is an enlarged detail sectional view taken on line 9 9 of Fig. 3, showing the means of rigidly supporting the cam plate and the yoke for unlocking the bobbin blank locking mechanism in the bobbin holders.
Figure 10:
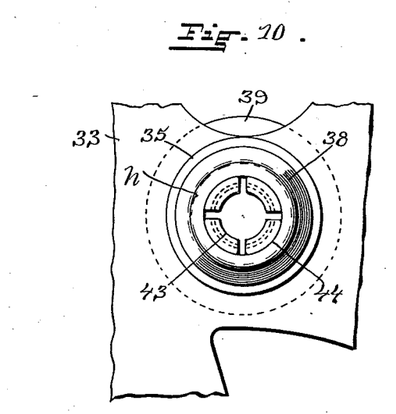
Fig. 10 is an enlarged detail view looking at the receiving end of one of the bobbin holders.

The bobbin holders $h$ each consist of a tube 37 rotatably held in the bearings 35 35 of the frame $g$ and having the open cone-shaped receiving end 38 and the pulley 39 secured to the tube intermediate the circular frame members 33 33. A bar 40 in the tube 37 is constructed to have a tubular portion 41 and a solid portion 42. The end of the tubular portion 41 is shaped to have an internal annular lip 43 for grasping the large end of a bobbin blank and an external annular flange 44. The end is split in a predetermined distance forming four equal spring members which are sprung outward, as shown in Fig. 7. A centering block 45 in the tubular portion 41 is constructed to have a cone-shaped cavity 46 in its forward end for the small end of a bobbin blank. A coiled spring 47 in the tubular portion 41 is intermediate the centering block 45 and the solid portion 42 of the bar 40 which extends outward from the frame $g$ and carries a sleeve 48 held from longitudinal movement by collars 49 49 secured to the bar 40. A stud 50 is secured to the adjacent frame member 33 and extends outward under and parallel with the bar 40. A slide 51 on the stud 50 is constructed to have an upwardly-extending yoke 52, the arms of which are secured to the sleeve 48 on the bar 40, fingers 53 53 on the yoke which extend outward parallel with and slightly beyond the end of the bar 40 and a roller 54 on the bottom of the slide in a position to engage with the cam plate $m$, as shown in Figs. 7, 8 and 9.

The bobbin holder frame operating arm $i$ has a roller 55 on its free end and is secured to the back shaft $e$ in a position for the roller to enter one of the radial slots 36 in the bobbin holder frame, as shown in Fig. 4, (when the arm is in its operative position) and rotate the bobbin holder frame one-twelfth of a revolution.

The bobbin holder frame locking mechanism $k$ consists of a cam 56 secured to the cam shaft $d$ and having a cam groove 57 in its face, a lever 58 pivotally secured adjacent the cam to a bracket 59 rigidly secured to the bed 14, said lever 58 having a roller 60 on its inner end engaging with the cam groove 57 in the cam 56 and a slot 61 in its outer end, a slide 62 in the bracket 59 having a roller 63 engaging with the lever 58 through the slot 61, and a projection 64 in a position to enter one of the radial slots 36 36 in the bobbin holder frame, as shown in Figs. 1 and 4.

The bobbin holder operating mechanism $l$ consists of a cam 65 having a cam groove 66 and secured to the cam shaft $d$, an arm 67 having a roller 68 engaging with the cam groove 66 in the cam 65, a rod 69 secured at its lower end to the arm 67 and supported in a vertical position in guides on the adjacent end support 18, a bell crank lever 70 having an arm 71 pivotally secured to the upper end of the rod 69, a flattened arm 72 which engages with the ends of the fingers 53 53 on the yoke of the slide 51 and pivotally secured to a bracket 73. This bracket 73 is secured to a disk 74 which is rigidly secured to the supporting bar $f$, as shown in Fig. 9, intermediate the bobbin holder frame $g$ and the adjacent end support 18.

The bobbin holder unlocking cam $m$ consists of a cam plate 75 having the cam surface 76 set at an angle to the plate, as shown in Fig. 8. This cam plate 75 is rigidly secured to the disk 74 in a position for the roller 54 on the slide 51 to engage with the cam surface 76, as shown in Fig. 9, when a bobbin holder $h$ has reached its delivery position.

The hopper $n$ consists of a hollow receptacle 77 open at the top and shaped to hold a plurality of bobbin blanks in a horizontal position, one above the other, as shown in broken lines in Fig. 6. An opening 78 is formed in the hopper at the bottom of the same and the hopper is secured to a bracket 79 which is rigidly secured to the top of the back guide support 20, as shown in Fig. 6.

The bobbin blank feed mechanism $o$ consists of a sprocket 80 on the cam shaft $d$, a sprocket 81 secured to a shaft 82 rotatably supported in a bearing 83 on the back guide support 20, a sprocket chain 84 connecting the sprockets 80 and 81, a cam 85 on the shaft 82, a rod 86 having a roller 87 on its lower end and reciprocally supported in guides on the back guide support 20 in a position for the roller 87 to engage with the cam 85, a bell crank lever 88 pivotally secured to the bracket 79 and having an arm 89 pivotally secured to the upper end of the rod 86, and an arm 90 pivotally secured to a slide 91 having an L-shaped forward end 92 and reciprocally supported in the bracket 79 in a position to move horizontally through the opening 78 in the hopper and carry a bobbin blank from the hopper to the charging position, as shown in broken lines in Fig. 6, with the charging point indicated by the arrow $w$.

The tool holder $p$ consists of a circular frame having a central hub 93 for reciprocally supporting the holder on the bar $f$, oppositely-disposed guides 94 94 in the guide ways 21 21 of the guide supports 20 20, and a series of twelve clamps 95 95 placed at equal distances apart on the periphery of the holder and in a position to bring the drills in alinement with the center of the bobbin holders $h$ $h$, as shown in Figs. 1 and 5. The upper back clamp 95, which is number twelve clamp, holds the charging rod $s$ in alinement with the charging point, as indicated by the arrow $w$ in Fig. 6, and the drills are held in succession in the clamps, starting with the short number 1 drill in the back number one clamp adjacent to the charging rod $s$ and ending with the long number 10 drill in the tenth clamp on the front. The eleventh clamp, which comes opposite the delivery point, as indicated by the arrow X in Fig. 6, is left blank or may be eliminated.

The tool holder operating mechanism $r$ consists of a cam drum 96 secured to the cam shaft $d$ and having a cam groove 97 in its face, a bracket 98 rigidly secured to the bed 14, a lever 99 pivotally secured at its center to the bracket 98 and having a roller 100 on its lower end engaging with the cam groove 97 in the cam drum 96 and a forked upper end 101 straddling the bar $f$ and two side links 102 102 pivotally connected to the forked upper end 101 of the lever 99 and to the hub 93 of the tool holder $p$, as shown in Figs. 1 and 5.

The delivery trough $t$ is secured to the tool holder $p$ in a position for the inner end to receive the bored bobbins from the bobbin holders, when a holder has reached the delivery point, as indicated by the arrow X in Fig. 6. The trough $t$ extends at an angle downward to the end of the machine, as shown in Fig. 1.

Figure 11:
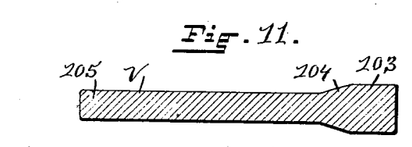
Fig. 11 is a sectional view taken lengthwise through a bobbin blank.
Figure 12:
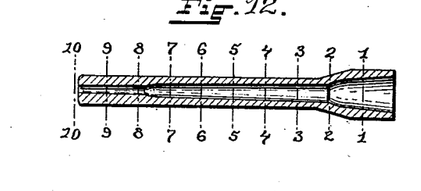
Fig. 12 is a sectional view similar to Fig. 11, showing the completed boring in the bobbin with transverse lines indicating the successive borings which the bobbin blanks may undergo in one operation of the machine.

The bobbin blank $v$ is in the form of a bobbin having a large end 103, a cone-shaped portion 104 and a small end 105, as shown in Fig. 11.

In the operation of our improved bobbin boring machine the driving pulley $b$ is revolved in the direction of the arrow by a belt as shown in broken lines in Fig. 1, and the bobbin holders $h$ $h$ are revolved at a comparatively higher speed by a belt engaging with the pulleys 39 39 on the bobbin holders, as shown in broken lines in Figs. 1 and 4. Power is now transmitted from the driving shaft $c$ through the pinion 22 and the gear 23 to revolve the cam shaft $d$ and through the gear 24 on the cam shaft and the wide face pinion 25 on the back shaft $e$ to revolve the back shaft two revolutions to one of the cam shaft. The cam 26 acts through the arm 28 to reciprocate the back shaft $e$ and move the bobbin holder frame operating arm $i$ out of its operative position for one revolution and then back into its operative position at the next revolution of the back shaft $e$, when the roll 55 on the arm $i$ enters one of the radial slots 36 in the bobbin holder frame $g$ and revolves the frame by a quick movement one-twelfth of a revolution, thus bringing an open bobbin holder $h$ to the charging point, indicated by the arrow $w$, as shown in Fig. 6. The bobbin holder frame locking mechanism $k$ is now operated through the cam 57 on the cam shaft $d$, and the lever 58 to move the slide 62 upward and force the projection 65 on the slide into the adjacent radial slots 36 in the bobbin holder frame to hold the frame from rotating on the bar $f$. The bobbin blank feed slide 91 is now operated through the sprocket 80 on the cam shaft $d$, the sprocket 81 on the shaft 82, the sprocket chain 84, the cam 85, the rod 86, and the bell crank lever 88 to carry a bobbin blank v on the L-shaped end 92 of the slide from the hopper n to the charging point, which brings the bobbin blank into alinement with the center of the open bobbin holder. The tool holder p is now moved toward the bobbin holders through the operation of the cam 96 on the cam shaft d, the lever 99 and the connecting links 102 102, when the charging rod s engaging with the large end 103 of the bobbin blank v pushes the bobbin blank into the open bobbin holder h. As the bobbin blank enters the holder the small end 105 of the bobbin blank enters the cone-shaped cavity 46 in the centering block 45 centering the bobbin blank and pushing the centering block 45 inward against the tension of the coiled spring 47. The bobbin holder operating mechanism l now operates through the cam 65 on the cam shaft d, the arm 67, the rod 69, the bell crank lever 70, the slide 51, the yoke 52, and the sleeve 48 on the bar 40 to push the bar 40 toward the tool holder p. This movement of the bar 40 brings the annular external flange 44 on the split tubular end of the bar into engagement with the inner face of the cone-shaped end 38 of the tube 37 which contracts the split end of the bar and forces the internal annular lip 43 onto the large end 103 of the bobbin blank and securely locks the bobbin blank in the bobbin holder, as shown in Fig. 8. The slide 91, the slide 62, the charging rod s, and the bell crank lever 70 now return to their original positions. In the next operation of the machine a bobbin blank is inserted into the next bobbin holder and the first bobbin blank is given its first partial boring by the short drill indicated by the numeral 1 in Figs. 1 and 5. In the next operation a bobbin blank is inserted into the next bobbin holder, the first bobbin blank is given its second partial boring by a slightly longer drill indicated by the numeral 2 in Fig. 5 and the second bobbin blank receives its first partial boring by the short drill indicated by the numeral 1. These operations are repeated until the first bobbin blank has reached the longest drill indicated by the numeral 10 in Figs. 1 and 5 and has received ten borings, the last boring given by number 10 drill finishing the bore of the bobbin. In this position of the machine the first bobbin blank has received the tenth or finished boring, the second bobbin blank has received nine borings, the third bobbin blank has received eight borings and so on to the tenth bobbin blank which has received its first or initial boring. In the next operation of the machine the bobbin holder having the number 1 bobbin is brought into the delivery position indicated by the arrow X in Fig. 6. The roller 54 on the slide 51 engages with the cam surface 76 on the cam plate 75 moving the slide outward and through the yoke 52 and the sleeve 48 on the rod 40 moves the rod 40 toward the driving pulley b, and releases the bobbin. The bobbin is now ejected from the holder by the centering block 45 through the tension of the coiled spring 47 into the trough t from which it may slide into a receptacle, not shown. This leaves each of the bobbin holders in succession in an open position, as shown in Fig. 7, to receive a bobbin blank on the next operation of the machine. From this point on a bobbin blank is fed into a bobbin holder and a bobbin having a finished boring is ejected from a bobbin holder into the trough t in each operation of the machine or for each revolution of the cam shaft d.

It is evident that any number of bobbin holders or drills could be used and that the structural details of the machine could be varied without materially affecting the spirit of our invention.

Having thus described our invention, we claim as new and desire to secure by Letters Patent:

1. In a bobbin boring machine, a rotatable frame having a plurality of bobbin holders, a non-rotatable tool holder composed of a slidable frame carrying a plurality of drills, a charging rod carried by said tool holder frame, means to feed bobbin blanks to a position between the front of the bobbin holders and the front end of said charging rod, means for moving said tool holder frame to bring said charging rod to engage a bobbin blank and force the latter into one of said bobbin holders, and means to rotate said bobbin holder frame.

2. In a bobbin boring machine, a horizontal shaft, a rotatable frame on said shaft, having a plurality of bobbin holders thereon, a slidable tool holder frame on said shaft carrying a plurality of drills, a charging rod carried by said tool holder frame, means to feed bobbin blanks to a position between the front of said bobbin holders and the charging rod, a pair of shafts, means actuated by one shaft to rotate said bobbin holder frame, means operated by the other shaft to actuate said first shaft and thereby said bobbin frame rotating means, means to lock said bobbin holder frame against rotation operated intermittently from said second shaft, and means to actuate said bobbin blank feeding means from said second shaft.

3. In a bobbin boring machine, a rotatable frame having a plurality of bobbin holders, a non-rotatable slidable frame carrying a plurality of drills, charging means carried by said slidable frame, means for intermittently rotating said bobbin holder frame, means for rotating said bobbin holders, means for feeding blanks in position to be engaged by said charging means to insert a bobbin blank into one of the bobbin holders, and means for actuating said slidable frame to simultaneously insert a bobbin blank into one of the holders and to cause said drills to engage the previously inserted blanks.

4. In a bobbin boring machine, a rotatable frame carrying a plurality of bobbin holders, means to intermittently move said frame in the arc of a circle, means to feed bobbin blanks to a position in front of said holders, means to rotate said holders, combined charging and drilling means to successively insert a blank into each holder and to operate on the previously inserted blanks, and means to move said combined means to and from said holders upon each partial rotation of said frame.

5. In a bobbin boring machine, a rotatable frame carrying a plurality of bobbin holders, means to intermittently move said frame in the arc of a circle, means to feed bobbin blanks to a position in front of said holders, means to rotate said holders, a tool holding frame slidable to and from said rotatable frame, means carried by said tool holding frame for engaging a blank and feeding same to one of said bobbin holders upon each forward movement of said tool holding frame, and means to reciprocate said tool holding frame.

6. In a bobbin boring machine, a frame carrying a series of bobbin holders, means to feed bobbin blanks to successively aline with said holders, means to bore said blanks, means to reciprocate said boring means toward and away from said frame, and means carried by said boring means and partaking of the reciprocating movement thereof to successively engage the blanks and project same into said bobbin holders, and means for intermittently moving said bobbin holder frame to present the successive holders to the feeding means and to the bobbin holding means.

7. In a bobbin boring machine, a frame carrying a series of bobbin holders arranged in approximate circular order, a second frame, a series of spaced boring tools carried by said frame and arranged in approximately circular order, means to rotate said bobbin holders, means to operate said second frame, and a charging member carried by said second frame and arranged to complete the circle nearly formed by said boring tools, and means for intermittently moving said bobbin holder frame to present the successive holders to the feeding means and to the bobbin holding means.

8. In a bobbin boring machine, a series of bobbin holders arranged in regular order, reciprocable boring means composed of a series of boring tools arranged in the same order as said holders, means interposed between said holders and boring means to feed blanks so as to successively aline with said holders, means to operate said boring means, there being a less number of boring tools than holders, and charging means movable with said boring means and disposed opposite one of the holders, and means for intermittently moving said bobbin holder frame to present the successive holders to the feeding point and to the bobbin holding means.

9. In a bobbin boring machine, a rotatable frame carrying a series of bobbin holders arranged in circular order, a second frame having reciprocating movement toward and away from said rotatable frame, a series of boring tools and a charging rod carried by said second frame and arranged in order corresponding to that of said holders, said boring tools and said rod conjointly being less in number than the number of holders, and means to actuate each of said frames.

10. In a bobbin boring machine, a rotatable frame carrying a series of bobbin holders, means to rotate said frame, means to bore the bobbin blanks, means to successively feed the blanks to and project the same into the front end of said holders, means to operate said holders from the rear thereof to lock the blanks in the holders, and a cam member operating independent of said holder operating means to engage the rear of said holders and release the bobbin blanks.

11. In a bobbin boring machine, a rotatable frame carrying a series of bobbin holders, means to successively automatically feed blanks to and secure same in said holders so as to be held against rotation, means to rotate said frame and said holders, a cam member to successively engage each bobbin holder and permit the release of the completed bobbin therefrom, and means to bore said blanks.

12. In a bobbin boring machine, a frame having a series of bobbin holders, means to intermittently rotate said frame, a reciprocable non-rotatable frame carrying a series of boring tools, a charging member carried by said frame and operable therewith to successively feed blanks to said holders, there being a less number of said boring tools than said holders, means to successively engage said holders and automatically discharge a bored bobbin therefrom during the rotation thereof and prior to the holders being presented to said charging member, and means for reciprocating said second frame.

13. In a bobbin boring machine, a stationary bar, a rotatable frame having a plurality of bobbin holders mounted on said bar, a non-rotatable tool holder composed of a frame slidable on said bar and having a plurality of drills secured thereto, means to periodically actuate said rotatable frame, means to actuate said tool holder frame, a charging rod carried by said tool holder frame, and means to feed bobbin blanks to a position to be engaged by the charging rod and thrust thereby into the bobbin holders.

14. In a bobbin boring machine, a frame carrying a plurality of bobbin holders, means for intermittently imparting partial rotation to said frame, combined means for boring the bobbin blanks and for engaging a bobbin blank to force the latter into one of said bobbin holders, means for feeding a blank so that the latter will aline with said means for forcing same into a bobbin holder and with said bobbin holder, and means for reciprocating said combined means for boring the blanks and for engaging the latter to force same into a bobbin holder.

15. In a bobbin boring machine, a frame carrying a plurality of bobbin holders, means for intermittently imparting partial rotation to said frame, a tool holder carrying boring means to operate on the blanks and bore same, means to feed bobbin blanks successively into the bobbin holders from the front thereof, means to operate the bobbin holders by engagement with the rear ends thereof, to lock the bobbin blanks in said holders after same have been received therein, means to intermittently operate said blank locking means, and means to engage the successive holders during the rotation thereof for unlocking said blanks from the bobbin holder.

In testimony whereof we have signed our names to this specification in the presence of two subscribing witnesses.

LUTHER C. BALDWIN.
EDWIN C. BUFFINGTON.

Witnesses:
ADA E. HAGERTY,
J. A. MILLER.